Oct. 17, 1933. J. W. MOORE 1,930,766

GASKET OR PACKING STRUCTURE

Filed Oct. 28, 1930

INVENTOR
Jas. W. Moore

By Meyers & Jones
ATTORNEY

Patented Oct. 17, 1933

1,930,766

UNITED STATES PATENT OFFICE 1,930,766

GASKET OR PACKING STRUCTURE

James W. Moore, Birmingham, Ala., assignor to American Cast Iron Pipe Company, Birmingham, Ala., a corporation of Georgia Application October 28, 1930. Serial No. 491,774

12 Claims. (Cl. 154—45.5)

The invention relates to improvements in gaskets or packing structures, adapted for use in packing stuffing box and gland joints of various characters.

The improved packing is especially well adapted for use in bell and spigot joints in gas pipe lines, but is not restricted to such use, and may be employed in pipe lines for other purposes or in stuffing boxes for reciprocating rods, such as piston rods, rotary shafts, etc.

The packing material may be made in continuous ring form or as here shown, in continuous strand or rope form from which pieces may be cut and arranged in the bell and spigot joint or stuffing box as desired.

A principal novel characteristic of the invention consists in a packing composed in part of fibrous material of which jute is one preferred example, and rubber or rubber composition; and in which the jute or other fibrous material is arranged in strands, preferably intermingled, twisted, interwoven, or, in one specific example, braided with other strands consisting partly of rubber or essentially of rubber or rubber composition. The complete composite packing may have different cross-sectional forms such as substantially square to adapt it for proper placing in many forms of joints or stuffing boxes, or it may be of other cross-section such as approximately round, or triangular.

One of the principal difficulties experienced in conveying natural gas and dehydrated manufactured gas in pipe lines, and especially in conveying dry gas in lines originally designed to handle wet or saturated manufactured gas, is the great leakage caused by the action of the dry gas, tending to shrink the usual type of packing, and causing leakage at the joints.

One of the principal objects of the present invention is the provision of a composite packing, consisting essentially of rubber or rubber composition, and fibrous material, such as jute, so constructed and arranged that the contraction of the one material under the action of the dry gas is compensated for by the swelling of the other material under the same influence.

Another object is to provide a gasket or stuffing box packing material of such character that it tends to balance the opposing forces or tendencies to which its internal and external surfaces are subjected, such as gas acting on the inner surface, and moisture having access to the inner or external surface. With the present improved gasket, in gas service, the tendency of dehydrated gas is to dry out the fibrous material, and to distend or swell the rubber; the swelling action on the rubber is greater than the shrinking action on the jute or equivalent fibrous material, so that the action of the gas tends to tighten the joint rather than to loosen it. With wet manufactured gas there is no particular tendency to contract the jute, but there is a tendency to swell the rubber, while water acts to swell the jute but has practically no effect upon the rubber. Hence the improved gasket, whether used with gas or water, will swell in use, thereby insuring and maintaining a tight joint.

While the improved gasket or packing material is of especial advantage with natural gas, it is also suitable and advantageous as a water joint, a steam joint, valve or rod packing, as well as a joint material for ordinary bell and spigot joints, and for the stuffing box type of joint, etc., as sufficiently mentioned early above.

The characteristics and advantages of the invention are further sufficiently explained in connection with the following detail description of the accompanying drawing, which show representative embodiments. After considering these examples, skilled persons will understand that many variations may be made without departing from the principles disclosed, and I contemplate the employment of any structures that are properly within the scope of the appended claims.

Fig. 11 shows a modification in which the interspersed or alternating strands to 2e, 3e, of fibre and rubber respectively, may be braided or twisted together or may be in the form of straight parallel strands of moderate cross-section, the whole assembly of strands being retained in desired cross-sectional form by an outer covering or envelope 10 of fabric, braided or woven, or otherwise placed about the strand assembly. The permeable fabric covering, when the packing is placed in a joint, permits access of gas or materials entrained by the gas, moisture, etc., to the fibre and rubber strands for the purposes and with the results above explained. Such a fabric covering for the strand assembly may be used in Fig. 9 instead of the rubber covering 4, or a rubber covering may be used with an assembly of strands having a straight lay.

Figure 3:
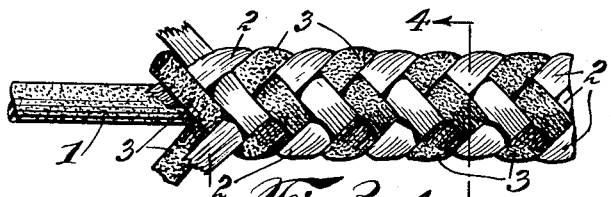
Fig. 3 shows the packing material in continuous or rope form.
Figure 7:
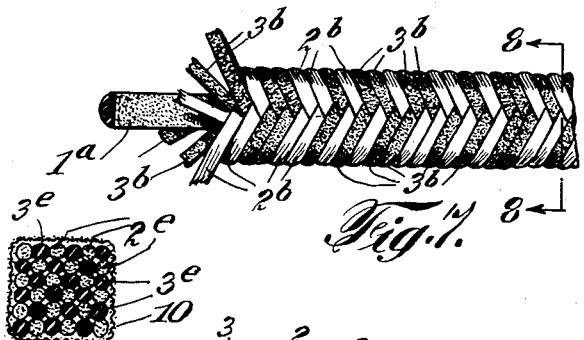
Fig. 7 shows another modification.
Figure 9:
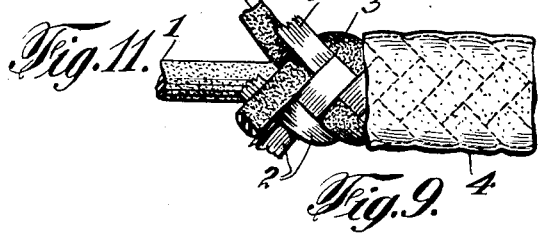
Fig. 9 is a similar view of still another modification.
Figure 10:
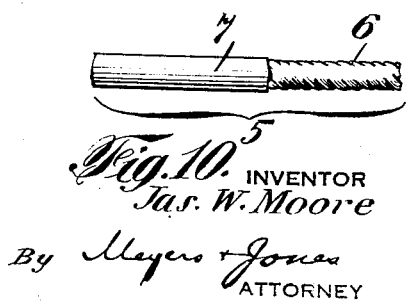
Fig. 10 shows a modified composite strand composed of fibrous material with a rubber coating or sheet.

Instead of a rubber core, such as 1 in Fig. 3, the core strand or center may be of fibre, or combined rubber and fibre; thus, the strand shown in Fig. 10, consisting of fibre 6 with a rubber covering 7, may be used as a composite center or core strand in the structures of Figs. 3, 7 or 9.

The packing material may, as here shown, be made in continuous or "rope" form, from which pieces of suitable length are cut off and wound about a shaft or reciprocating rod or placed in any of the usual ways in a stuffing box or pipe joint, etc. Otherwise the packing may be provided in circular or gasket form or pieces of the present continuous form packing may be bent and secured in ring form.

Figure 4:
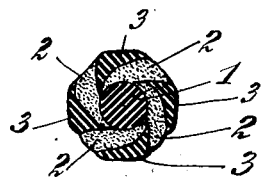
Fig. 4 is a section at 4—4, Fig. 3.

When in continuous or rope form, as here shown, the packing material, as shown in Figs. 3 and 4, may consist of a center or core 1, which may be a single strip of rubber or suitable rubber composition of desired cross section, such as round. Around this core or center is formed a covering consisting of alternating strands 2 of suitable fibrous material such as jute and other strands 3 of rubber or suitable rubber composition. The rubber and jute strands are braided about the center in any of the various ways, one braid arrangement being shown in Figs. 3 and 4 in which the rubber strands 3 appear at the surface of the composite packing in annular zigzag strands in similar zigzag annular zones. In this form and with this method of braiding, the cross section of the complete packing may be polygonal, or approximately round, as shown in Fig. 4.

Each jute or similar fibrous strand consists of a multiplicity of fibres laid with a spiral twist as usual. Each rubber strand may consist of a single piece or of a plurality of individual strips or strands with a twisted or straight lay to form a single strand, as indicated at 3.

Figure 5:
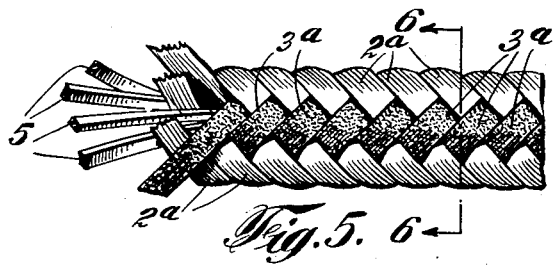
Fig. 5 is a side elevation of a modified form.
Figure 6:
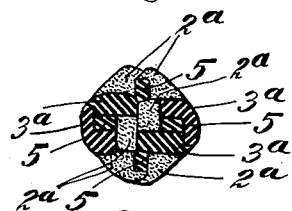
Fig. 6 is a section at 6—6, Fig. 5.

Figs. 5 and 6 show a modification in which there is a plurality of inner or core strands 5 of rubber or rubber composition, each consisting of a single strip or a plurality of individual small strips (as referred to in the first example) with strands 2a of fibrous material and other strands 3a of rubber or rubber composition braided with the jute strands about the individual core strands 5.

In this method of braiding the rubber strands appear at the surface of the composite packing in the form of longitudinal stripes or zones alternated with similar longitudinal zones consisting of exposed surfaces of the jute strands 2a.

Figure 8:
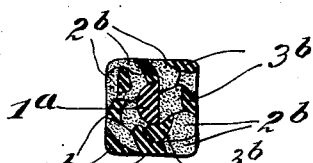
Fig. 8 is a section at 8—8, Fig. 7.

Figs. 7 and 8 show a modification in which there is a greater plurality of rubber strands 3b of relatively small diameter, interbraided with suitably dimensioned strands 2b of the jute or other fibre, the jute and rubber strands being braided about a single core piece or strand 1a of rubber or rubber composition.

Figs. 6 and 8 show that the composite packing may be produced in a square or approximately square cross-section to properly fit into packing spaces or stuffing boxes of usual type.

Fig. 9 shows another modification in which the complete composite packing as in any of the other figures may be encased in a covering 4 of rubber or suitable rubber composition. This covering or casing layer is usually quite thin and is provided largely to prevent untwisting or raveling of the different strands when pieces are cut from the continuous or rope packing. The covering may be of such thickness that it may be ruptured when placed and squeezed in position in a packed joint or of such a nature that it will not prevent access to the combined jute and rubber strands of gas or components thereof from within the joint or of moisture from within or without the joint to exert upon the packing the effects recited early above, tending to swell the component materials or by swelling of certain of the materials while others are contracted, to maintain the tightness of the joint.

Fig. 10 shows a single composite strand 5 which may consist of a core or center 6 of jute or other suitable fibrous material with a twisted lay as shown, and a covering 7 of suitable thickness, of rubber or rubber composition. This may be substituted in any of the forms shown for the rubber strands such as 3, 3a, 3b, and in such cases the complete packing will consist of fibrous strands alternating or inter-braided with strands consisting of fibre and rubber or consisting of a fibrous core with a rubber covering.

The proportions of rubber or rubber composition and of fibre in the complete composite packing may vary considerably and may be regulated by varying the dimensions of the respective rubber and fibrous strands or the relative numbers of such strands, etc. In some cases the rubber and fibrous material may be in substantially equal proportions, or as just stated, the relative proportions may vary greatly in accordance with the uses of the packing, the action upon its component materials of different fluids to which it is exposed, or the degree of expansion tendency desired for different purposes.

Figure 1:
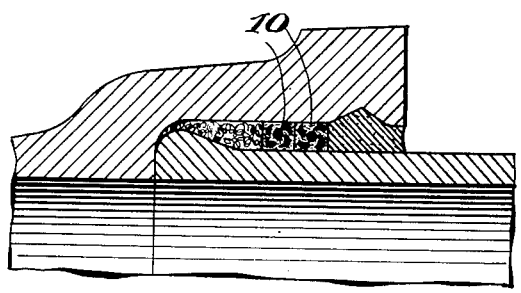
Fig. 1 is a longitudinal section of a spigot joint showing packing embodying the invention in one form properly placed therein.
Figure 2:
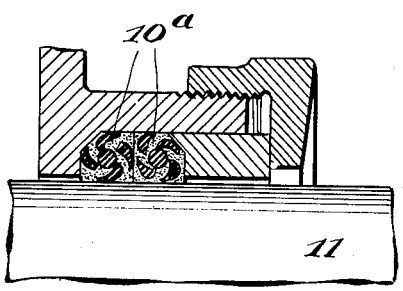
Fig. 2 shows the use of the packing in a stuffing box about the reciprocating rod or rotary shaft.

Fig. 1 shows a pipe joint of the bell and spigot type constructed or arranged as usual, except that the intermediate packing 10 therein consists of one or more pieces, or a plurality of turns of the present composite packing. When a pipe line with joints of this character is used for natural gas, for example, the dehydrated gas gaining access to the packing 10 will tend to shrink the jute strands thereof but at the same time will tend to swell the rubber strands or portions to a compensating or more than a compensating degree; and similarly whether used for manufactured gas or other fluid, moisture gaining access from the outside to the packing 10 will tend to swell the jute or other fibrous component of the packing. Fig. 2 shows the present packing material 10a in one form of stuffing box, about a rotary shaft or reciprocating rod 11.

While I have described the various forms of the packing as composed of or comprising rubber and fibrous strands, braided or interbraided together, and this braided construction is preferable in many cases, in the broader aspect of the invention the various strands may be interassociated or intermingled in various ways, as by twisting or similar operations, or even in parallel lays with a casing; the structure is such, however, that in preferred forms, portions of both rubber and fibrous strands so assembled that the two materials are in intimate association and of relatively small cross sectional areas, so that the swelling action of the one offsets or exceeds the contracting action (if any) of the other, as in the example given.

In all of the various described forms of the invention it will be understood that the rubber strands are under substantially no stretch when interbraided or interassociated with the jute strands, hence the finished packing will maintain its cross-sectional shape when made, but is readily deformable when packed into a joint space.

I claim:—

1. Packing material comprising a core of rubber and fibrous strands and rubber strands interbraided about the core, the fibrous strands being normally free of lubricant.

2. A packing for purposes described comprising a plurality of fibrous strands with a spiral lay interbraided with a plurality of other strands comprising rubber, the fibrous strands being normally free of lubricant.

3. A packing for purposes described comprising a plurality of rubber core strands and a plurality of rubber strands and fibrous strands interbraided about the core strands, the fibrous strands being normally free of lubricant.

4. A packing for purposes described comprising a plurality of jute strands with a spiral lay interbraided with a plurality of other strands comprising rubber, the jute strands being normally free of lubricant.

5. A packing for purposes described comprising a plurality of jute strands with a spiral lay interbraided with a plurality of other strands composed of fibre with a rubber covering, the jute strands being normally free of lubricant.

6. A gasket or packing composed of braided strands of vulcanized rubber and fibrous material in substantially equal proportions, the fibrous material being normally free of lubricant.

7. A joint or like packing composed of interassociated strands of fibrous material and rubber, with portions of both strands exposed at the surface of the packing, the fibrous strands being normally free of lubricant.

8. A joint or stuffing box packing comprising a core of fibrous material and rubber, and outer intermingled strands of rubber and fibre assembled about the core, the fibrous material being normally free of lubricant.

9. A unitary-composite packing for purposes stated, comprising strands characteristically of fibre, and other strands consisting characteristically of rubber, the rubber and fibre strands being in intermingled relation, and an outer covering of fabric retaining the strands in assembled relation, the fibrous strands being normally free of lubricant.

10. A gasket or packing composed of braided strands of vulcanized rubber and fibrous material.

11. A gasket or packing composed of strands of a plurality of materials braided together, one of which is rubber and others of which expand under the action of moisture.

12. A gasket or packing composed of substantially equal parts of vulcanized rubber and fibrous material, both in the form of strands or threads, and intermixed together.

JAMES W. MOORE.